April 16, 1968

L. L. SHUMAKER 3,377,749

ABRASIVE MARKING

Filed Sept. 10, 1965

INVENTOR
LYLE L. SHUMAKER

ATTORNEYS

United States Patent Office 3,377,749
Patented Apr. 16, 1968

3,377,749
ABRASIVE MARKING
Lyle Lavern Shumaker, Natrona Heights, Pa., assignor to Pittsburgh Plate Glass Company, Pittsburgh, Pa., a corporation of Pennsylvania
Filed Sept. 10, 1965, Ser. No. 486,490
2 Claims. (Cl. 51—8)

ABSTRACT OF THE DISCLOSURE

Apparatus for marking glass sheets by abrasive blasting comprising a stencil carrying cover secured in sliding relation to a chamber disposed beneath an opening in a glass sheet supporting table through which an abrasive mixture is blasted upward. The stencil is normally supported by gravity below the upper surface of the table which supports a glass sheet to be marked, but is lifted into intimate contact with the glass sheet under surface whenever the abrasive mixture is blasted upwardly.

---

This invention relates to abrasive marking and particularly relates to marking a surface of a hard substance such as glass by abrasive blasting. Abrasive blasting is commonly employed to apply a trademark to a fabricated glass product to identify its origin. Sand, garnet, crushed steel, silica and other pulverulent materials having sufficient hardness to abrade glass on contact are commonly used.

The present invention was developed to improve the efficiency of trademarking glass parts with the well-known PPG trademark of the Pittsburgh Plate Glass Company, to prolong the life of a replacable stencil forming part of the trademarking apparatus, and to provide simple operating parts free from maintenance problems to actuate movement of the stencil.

A brief description of certain patents in the field of the abrasive blasting of glass follows to help understand the present invention.

Traditionally, abrasive blasting was accomplished by blasting a mixture of abrasive and air under pressure through a stencil supported in an aperture at the level of the top of an apertured table. Flat glass sheets to be trademarked were slid along the table top to a desired position of alignment with the stencil. In some apparatus, such as shown in U.S. Patent No. 1,819,331 to William O. Lytle, the stencil was urged upward to insure intimate contact with the under surface of the glass sheet being marked. Sliding the glass along the table top into its desired position of alignment rubbed the rubber stencil and caused its rapid wear and frequent replacement.

U.S. Patent No. 2,608,800 to George F. Ritter discloses a trademarking apparatus that includes a movable abrasive delivery system that moves upward to contact a glass article in response to the action of a glass scoring device and moves downward out of contact with the article to permit movement of the glass into and out of trademarking and scoring position. The aforesaid apparatus reduces the rate of wear of the rubber covering for the trademarking stencil, but requires complicated mechanism to correlate the movement of the trademarking device with the operation of the glass scoring device.

Since glass breakage cannot be avoided entirely during its handling throughout its fabrication, it is desired to have the glass trademarking occur as late as possible in the fabrication process so as to avoid wasting abrasive material for articles that fail to reach commercial channels. It is also the desire of the present invention to minimize the requirement for complicated mechanisms to actuate the movement of the stencil into operative position in contact with the glass surface after the glass has moved into its position of alignment and to permit ready removal of the stencil from contact with the glass to permit movement of the glass away from the trademarking position.

A preferred embodiment of the present invention will now be described in order to enable the reader to understand how the present invention differs from the prior art.

In the drawings which form part of the description of the present invention and wherein like reference numbers refer to like structural elements, FIG. 1 is an end elevation partially in section of a table provided with the present invention;

Figure 1:
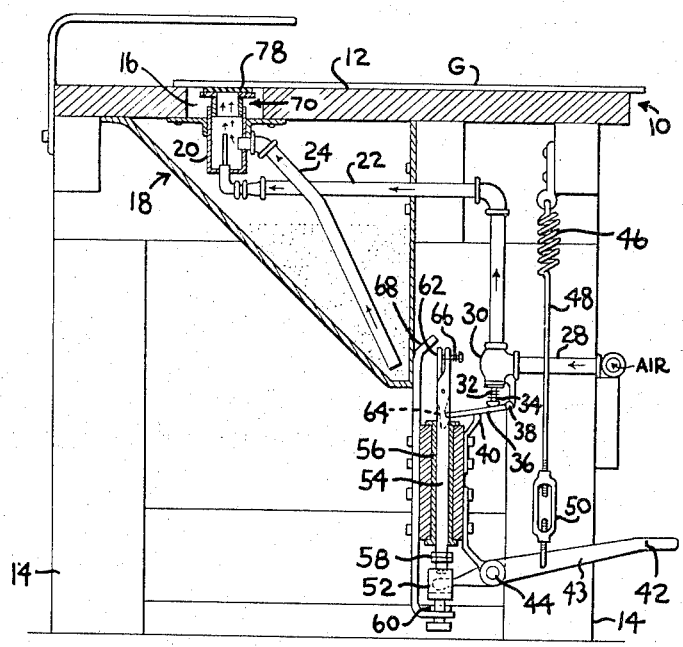
Figure 3:
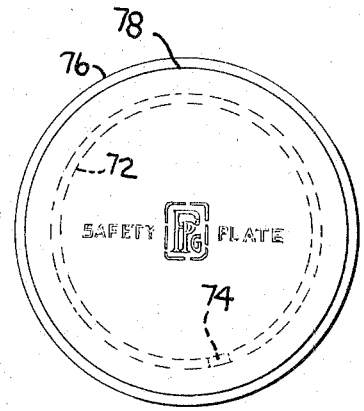
FIG. 3 is a plan view of the stencil shown in detail in FIG. 2.

Referring to the drawings, a table 10 having a table top 12 supported on legs 14 is provided with an opening 16. A hopper 18 is located directly beneath the opening 16 for the upward flow of abrasive against a portion of the under surface of a glass sheet G exposed to the opening 16 as the sheet G rests on the table top 12.

Figure 4:
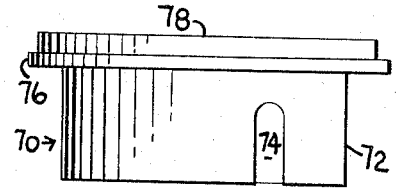
FIG. 4 is an exploded view of the structure of FIG. 2 in elevation.
Figure 2:
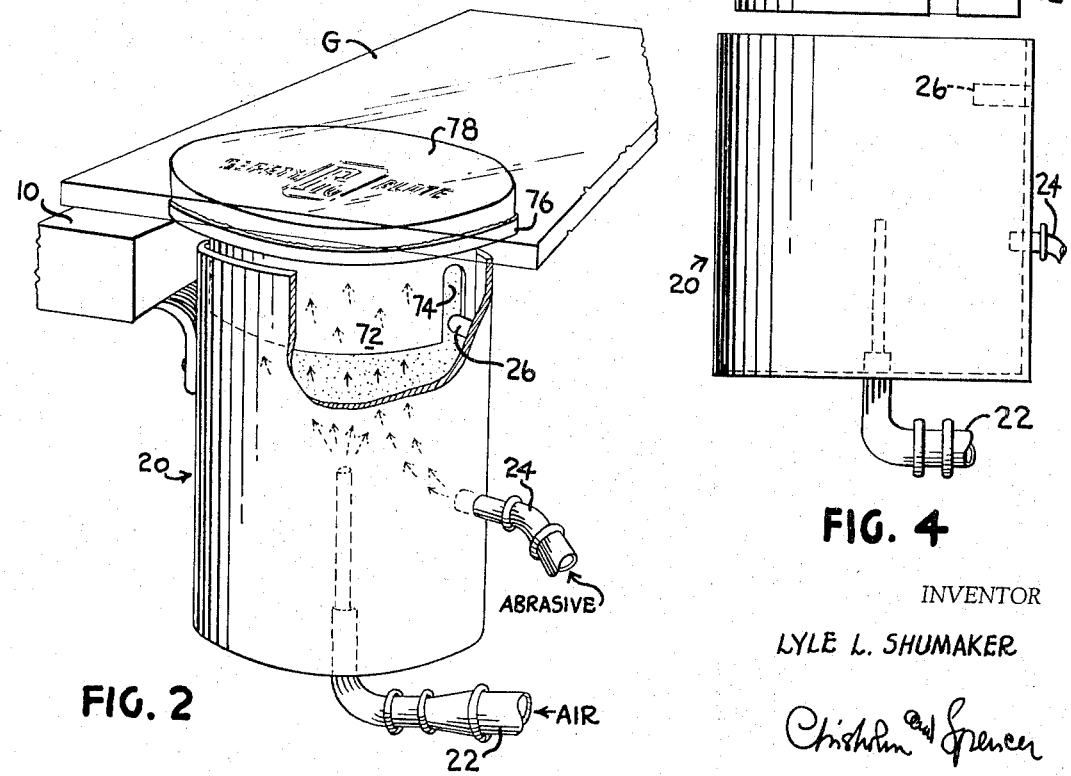
FIG. 2 is an enlarged perspective view, partially broken away, of the critical structural elements of a rubber stencil and its support structure according to the present invention.

A mixing chamber 20 is attached to the under surface of the table directly beneath the opening and in the upper portion of the hopper 18. The mixing chamber 20 is of circular cross section. An air delivery pipe 22 extends through the bottom of the mixing chamber and in an upward axial direction with its opening into the mixing chamber 20 spaced below the opening 16. An abrasive delivery pipe 24 has its lower end within a supply of abrasive within the hopper 18 and its upper end extending through the wall of the mixing chamber 20. A pin 26 (see FIGS. 2 and 4) extends radially inward from the inner wall of the mixing chamber 20 for purposes to be described later.

An air supply pipe 28 communicates with the air delivery pipe 22 from a source of air (not shown). A valve casing 30 supports a valve at a coupling between the air supply pipe 28 and the air delivery pipe 22. A valve stem 32, having a spring 34 surrounding its outer wall, is attached directly to the valve within the valve casing 30. A lever 36 pivoted at a pivot 38, and provided with a stop 40, engages the valve stem 32 when the valve within the valve casing 30 is closed.

A foot treadle 42, connected to a lever 43 pivoted at 44, normally opens the valve within valve casing 30 when actuated. However, the valve is normally held in the position shown in FIG. 1 by a spring 46.

The spring has its lower end connected to the lever 43 by means of a downwardly extending wire 48 and a turnbuckle connection 50. A short end of the lever 43 inward of the pivot 44 has a rocking engagement with a block 52 carried by the lower end of a rod 54. The latter is slidably mounted in a sleeve 56. A pair of stop nuts 58 around rod 54 below the sleeve 56 adjusts the upper limit of movement for the rod 54. Downward movement of the latter is limited by the additional stop 60.

The rod 54 carries at its upper end a latch 62. The latter, in turn, is provided with a hook 64 at its lower end and is engaged at its upper end by a spring 66. The latter normally presses the upper end of the latch to the left as seen in FIG. 1. When the parts are in the position shown and the rod 54 moves upward, the hook 64 engages the end of the lever 36 and causes it to move up, thus opening the valve in the casing 30. On a further upward movement of the rod 54, the upper end of the latch 62 is engaged by a trip member 68. This engagement forces the upper end of the latch 62 to the right to disengage the hook 64 from the lever 36, thus permitting the spring 34 to close the valve within the valve casing 30.

From the above description it is obvious that when the foot treadle 42 is depressed, it first opens the valve within the valve casing 30 and then permits it to snap closed. The parts are adjusted so that this movement controlled by the treadle provides just the right amount of opening to the valve within the valve casing 30 to obtain the desired abrasive blasting effect upon the glass.

Very little judgment is required on the part of an operator. Thus, actuation of the treadle 42 results in a uniform supply of abrasive for each actuation of the foot treadle. Sufficient abrasive is supplied at each operation of the treadle, and there is no waste of abrasive and air due to a too prolonged opening of the air valve. Increased speed of operation is also secured due to this method of operation as only a single movement is required in order to control both movements of the air valve. The arrangement containing the hopper beneath the opening permits the abrasive to be used over and over again as there is practically no loss.

The above description omits a necessary element of the sandblasting apparatus, namely, the stencil through which the abrasive is supplied and its supporting structure. According to the prior art, its structure comprises a rigidly mounted soft metal cover sufficiently apertured to support a thin rubber stencil that is stretched over the cover and contains openings conforming to the trademark desired to be impressed by abrasive blasting on the under surface of the glass.

It is readily obvious that movement of the glass sheet over the top of the table 12 would rub the rubber stencil stretched over a cover rigidly mounted to the table and cause frequent replacement. It is equally obvious that the other prior art solution, making the entire abrasive delivery system movable relative to the table, entails complicated motion imparting apparatus.

The present invention avoids the problem of the prior art by substituting for the inferior prior art structures described above a vertically movable cover member that is relatively light and easily displaceable in response to an upward flow of air-abrasive mixture against the under surface of a glass sheet when the treadle 42 is actuated.

In an illustrative embodiment of this invention, the relatively light movable cover 70 comprises a vertical cylindrical skirt 72 provided with a vertically extending slot 74 extending from the bottom thereof, and a horizontal peripheral ledge 76 of soft metal. A soft rubber stencil 78 containing the desired trademark is attached to the peripheral horizontal ledge 76 and is stretched in a position so as to provide an unwrinkled presentation of the trademark to the under surface of the glass.

The vertical skirt 72 is constructed to make a telescopic sliding fit with the inner wall of the mixing chamber 20. For example, a skirt having an outer diameter of 2$\frac{1}{32}$ inches was received in a mixing chamber having an inner diameter of 2$\frac{1}{16}$ inches.

Normally, the vertical slot 74 is engaged by the radial pin 26 and the cover 70 containing the stencil 78 slides downward by gravity in a recessed position below the horizontal surface of the table top 12. This arrangement permits a glass sheet G to be placed into position to be trademarked without rubbing against the stencil 78.

When a glass sheet is in a position of alignment over the opening 16, actuation of the foot treadle 42 causes air to flow from air supply pipe 28 through the valve casing 30 and the air delivery pipe 22 into the mixing chamber 20. A Venturi effect causes a reduction of pressure thereby lifting abrasive from the hopper 18 into the mixing chamber 20 through the abrasive delivery pipe 24.

The abrasive mixes with the blast of air coming up through the air delivery pipe 22 and forces the cover 70 upward until the rubber stencil 78 is in intimate contact with the glass. The air blast forces the abrasive through the orifices in the stencil 78 to produce the desired trademark on the under surface of the glass for the time necessary to produce an adequate trademark.

Where the supply of air is stopped due to the automatic operation of the apparatus as described above, the air pressure that lifts the cover 70 and its stencil 78 is no longer available to force the cover 70 and its stencil 78 upward. The latter thus drops by gravity into its recessed position with the slot 74 in alignment with the pin 26. Thus, every time a plate is in position to be trademarked, the stencil is automatically moved upward by the upward sliding of the cover 70 relative to the mixing chamber 20 in response to the upward blast of air and abrasive. Immediately upon the conclusion of the upward air blast, gravity permits the cover to settle in its retracted position with the groove 74 and pin 26 providing guidance for proper orientation of the trademark and insuring that the trademark remains in proper orientation relative to the glass sheet during the application of the abrasive.

The method of marking the under surface of sheet material provided by the present invention comprises supporting a stencil in recessed relation to the top of an apertured table by gravity, locating a sheet of material to be marked in alignment with the aperture while the stencil is so supported in recessed relation to the top of the table, and flowing a mixture of air and abrasive in an upward direction through the stencil at a rate sufficient to lift the stencil into intimate contact with the under surface of the sheet material to be marked and yet insufficient to lift the work piece. Since the glass sheets are much heavier than the movable cover that contains the stencil, it is a relatively easy matter to limit the rate of flow of air and abrasive in an upward direction to produce the desired results.

While the embodiment described herein above is an illustrative embodiment of the present invention, it is understood that various changes in design may be made within the spirit of the invention which is described in the claimed subject matter that follows.

What is claimed is:

1. Apparatus for marking glass sheets by abrasive blasting comprising a table having an upper surface for supporting a glass sheet to be marked, an opening in said table, a chamber beneath said opening and aligned therewith, a cover secured in sliding relation to said chamber, an opening in the upper end of said cover, a stencil disposed across said opening in said cover, means for supporting said cover by gravity in a retracted position wherein said stencil is disposed below said upper surface of said table and means for supplying a mixture of pressurized air and abrasive in an upward direction through said chamber and said stencil carried by said cover at a rate sufficient to slide said cover upward relative to said chamber until said stencil is in intimate contact with a portion of a glass sheet extending across said opening when said glass sheet is supported on said upper surface of said table.

2. Apparatus as in claim 1, further including guide means for orienting said cover relative to said chamber while permitting said cover to slide upward in response to said supplying of said mixture and to slide downward by gravity to said recessed position in the absence of said supplying.

References Cited

UNITED STATES PATENTS

| 955,468 | 4/1910 | Motz | 51—8 |
| 1,819,331 | 8/1931 | Lytle | 51—8 |
| 2,034,308 | 3/1936 | Morgan | 51—310 X |
| 2,328,350 | 8/1943 | Lindenmeyer | 51—8 |
| 2,608,800 | 9/1952 | Ritter | 51—5 |

LESTER M. SWINGLE, *Primary Examiner.*